(12) United States Patent
Lunati (10) Patent No.: US 8,321,786 B2
(45) Date of Patent: Nov. 27, 2012

(54) ROUTINE AND INTERFACE FOR CORRECTING ELECTRONIC TEXT

(75) Inventor: Stephane Lunati, Fremont, CA (US)

(73) Assignee: Apple Inc., Cupertino, CA (US)

( * ) Notice: Subject to any disclaimer, the term of this patent is extended or adjusted under 35 U.S.C. 154(b) by 1693 days.

(21) Appl. No.: 10/870,269

(22) Filed: Jun. 17, 2004

(65) Prior Publication Data

US 2005/0283726 A1    Dec. 22, 2005

(51) Int. Cl.
*G06F 17/21* (2006.01)
*G06F 17/24* (2006.01)

(52) U.S. Cl. ........ 715/257; 715/234; 715/239; 715/256; 715/265; 715/760

(58) Field of Classification Search .................. 715/533, 715/234, 239, 257, 256, 265, 760, 767
See application file for complete search history.

(56) References Cited

U.S. PATENT DOCUMENTS

| | | | | |
|---|---|---|---|---|
| 5,261,112 A * | 11/1993 | Futatsugi et al. | ............ | 715/533 |
| 5,337,407 A * | 8/1994 | Bates et al. | .................. | 715/751 |
| 5,576,955 A * | 11/1996 | Newbold et al. | ............. | 715/217 |
| 5,604,897 A * | 2/1997 | Travis | ........................... | 715/257 |
| 5,649,222 A * | 7/1997 | Mogilevsky | .................. | 715/257 |
| 5,666,139 A * | 9/1997 | Thielens et al. | ............. | 345/173 |
| 5,678,053 A * | 10/1997 | Anderson | ......................... | 704/1 |
| 5,710,832 A * | 1/1998 | Berman et al. | ................ | 382/189 |
| 5,765,180 A * | 6/1998 | Travis | ........................... | 715/533 |
| 5,812,863 A * | 9/1998 | Ishikawa | ...................... | 715/533 |
| 5,819,032 A * | 10/1998 | de Vries et al. | ............... | 709/250 |
| 5,870,548 A * | 2/1999 | Nielsen | ......................... | 709/206 |
| 5,907,680 A * | 5/1999 | Nielsen | ......................... | 709/228 |
| 5,940,847 A * | 8/1999 | Fein et al. | ...................... | 715/236 |
| 5,970,492 A * | 10/1999 | Nielsen | ......................... | 707/10 |
| 5,974,370 A * | 10/1999 | Suda et al. | ........................ | 704/2 |
| 6,012,075 A * | 1/2000 | Fein et al. | ...................... | 715/256 |
| 6,122,613 A * | 9/2000 | Baker | ........................... | 704/235 |
| 6,128,635 A * | 10/2000 | Ikeno | ........................... | 715/532 |
| 6,131,102 A * | 10/2000 | Potter | ........................... | 715/533 |
| 6,144,958 A * | 11/2000 | Ortega et al. | ..................... | 707/5 |
| 6,157,910 A * | 12/2000 | Ortega | ......................... | 704/231 |
| 6,356,937 B1 * | 3/2002 | Montville et al. | ............ | 709/206 |

(Continued)

OTHER PUBLICATIONS

Microsoft.com et al. "MSDN—Using thet TextRange Object" Oct. 2008—http://msdn.microsoft.com/en-us/library/ms533042(Vs.85).aspx.*

(Continued)

*Primary Examiner* — Steven B Theriault
(74) *Attorney, Agent, or Firm* — Womble Carlyle Sandridge & Rice LLP (57) ABSTRACT

Error checking and correction techniques for web based applications use an error checking routine on a server or a client station to find errors in electronic text of an E-mail message. The disclosed error checking routine detects errors such as spelling errors in the electronic text and creates a correction file of the electronic text containing tags, markers and other information allowing errors to be displayed and corrected using the user's graphical interface. The graphical interface allows the user to review all the errors concurrently in the correction file and to correct the errors in any order. In a preferred embodiment, correction is facilitated in response to the user moving a mouse pointer over an error of interest, which provides correction options to be displayed in-line with the original text. The user can then select a suitable correction to correct the error.

59 Claims, 8 Drawing Sheets

U.S. PATENT DOCUMENTS

| | | | | |
|---|---|---|---|---|
| 6,424,983 | B1* | 7/2002 | Schabes et al. | 715/533 |
| 6,460,074 | B1* | 10/2002 | Fishkin | 709/206 |
| 6,513,031 | B1* | 1/2003 | Fries et al. | 1/1 |
| 6,583,798 | B1* | 6/2003 | Hoek et al. | 715/822 |
| 6,616,704 | B1* | 9/2003 | Birman et al. | 715/234 |
| 6,629,129 | B1* | 9/2003 | Bookspan et al. | 709/204 |
| 6,714,214 | B1* | 3/2004 | DeMello et al. | 715/711 |
| 6,760,700 | B2* | 7/2004 | Lewis et al. | 704/235 |
| 6,760,746 | B1* | 7/2004 | Schneider | 709/203 |
| 6,785,869 | B1* | 8/2004 | Berstis | 715/532 |
| 6,836,759 | B1* | 12/2004 | Williamson et al. | 704/235 |
| 6,889,361 | B1* | 5/2005 | Bates et al. | 715/533 |
| 6,918,086 | B2* | 7/2005 | Rogson | 715/257 |
| 6,989,822 | B2* | 1/2006 | Pettiross et al. | 345/179 |
| 7,032,174 | B2* | 4/2006 | Montero et al. | 715/533 |
| 7,058,944 | B1* | 6/2006 | Sponheim et al. | 718/100 |
| 7,080,316 | B2* | 7/2006 | Tesch et al. | 715/512 |
| 7,137,076 | B2* | 11/2006 | Iwema et al. | 715/863 |
| 7,185,271 | B2* | 2/2007 | Lee et al. | 715/507 |
| 7,185,285 | B2* | 2/2007 | Van Dok et al. | 715/753 |
| 7,194,684 | B1* | 3/2007 | Shazeer | 715/205 |
| 7,207,004 | B1* | 4/2007 | Harrity | 715/533 |
| 7,305,627 | B2* | 12/2007 | Tannenbaum | 715/751 |
| 7,392,293 | B2* | 6/2008 | Leonik | 709/217 |
| 7,562,295 | B1* | 7/2009 | Jones et al. | 715/257 |
| 7,717,712 | B2* | 5/2010 | Brun et al. | 434/156 |
| 7,725,841 | B2* | 5/2010 | Michelman et al. | 715/856 |
| 7,779,353 | B2* | 8/2010 | Grigoriu et al. | 715/255 |
| 7,996,768 | B2* | 8/2011 | Abernethy et al. | 715/257 |
| 2002/0194229 | A1* | 12/2002 | Decime et al. | 707/533 |
| 2002/0194278 | A1* | 12/2002 | Golan | 709/206 |
| 2003/0046350 | A1* | 3/2003 | Chintalapati et al. | 709/206 |
| 2003/0084099 | A1* | 5/2003 | Kamine | 709/203 |
| 2004/0107089 | A1* | 6/2004 | Gross et al. | 704/10 |
| 2004/0111475 | A1* | 6/2004 | Schultz | 709/206 |
| 2004/0205672 | A1* | 10/2004 | Bates et al. | 715/533 |
| 2004/0205674 | A1* | 10/2004 | Delgado et al. | 715/536 |
| 2004/0250208 | A1* | 12/2004 | Nelms et al. | 715/533 |
| 2004/0268235 | A1* | 12/2004 | Wason | 715/513 |
| 2005/0108336 | A1* | 5/2005 | Naick et al. | 709/206 |
| 2005/0149867 | A1* | 7/2005 | Freelander et al. | 715/533 |
| 2005/0204292 | A1* | 9/2005 | Kibilov et al. | 715/738 |
| 2005/0223326 | A1* | 10/2005 | Chang et al. | 715/533 |
| 2005/0235031 | A1* | 10/2005 | Schneider et al. | 709/203 |
| 2005/0262203 | A1* | 11/2005 | Buchheit et al. | 709/206 |
| 2006/0080292 | A1* | 4/2006 | Alanzi | 707/3 |
| 2006/0143564 | A1* | 6/2006 | Bates et al. | 715/533 |
| 2006/0167981 | A1* | 7/2006 | Bansod et al. | 709/203 |
| 2007/0016616 | A1* | 1/2007 | Brill et al. | 707/104.1 |

OTHER PUBLICATIONS

Description of Google's GMail entitled "About GMail," obtained from http://gmail.google.com/gmail/help/about.html, dated Jun. 15, 2004, 3-pgs.

Screen Shots of Google's GMail, dated Apr. 13, 2004, 5-pgs.

Description of Google's GMail entitled "kwc:blog: GMail initial thoughts," obtained from http://kwc.org/blog/archives/001407.html, posted Apr. 13, 2004, 6-pgs.

Description of Google's GMail entitled "JG: My look at GMail [screenshots]," obtained from http://iheartmena.typepad.com/weblog/2004/04/my_look_at_gmai.html, posted Apr. 9, 2004, 4-pgs.

Description of Google's GMail entitled "Dylan Green dot com—I got GMail. Now what?," obtained from http://www.dylangreene.com/blog.asp?blogID=439, posted May 6, 2004, 3-pgs.

Description of Google's GMail entitled "GMail is Awsome!!!!!!!," obtained from http://news.com.com/25208-1023-0.html?forumID=1&threadID=511&messageID=2556&st . . . , posted May 3, 2004, 2-pgs.

Screen Shots of Google's GMail, generated Jun. 15, 2004, 2-pgs.

* cited by examiner

ROUTINE AND INTERFACE FOR CORRECTING ELECTRONIC TEXT

FIELD OF THE DISCLOSURE

The subject matter of the present disclosure relates to an interface for correcting electronic text. More particularly, the subject matter relates to a web-based interface for correcting spelling, grammar, syntax, or other errors in electronic text of an E-mail message.

BACKGROUND OF THE DISCLOSURE

A number of services exist for sending e-mail messages through an Internet, web, or HyperText Mark-up Language (HTML) interface. Such services are typically resident on a server connected to the Internet, and thus provide a convenient means for allowing users to communicate because they typically require no special software or minimal software to be present on the users' computer.

Figure 1A:
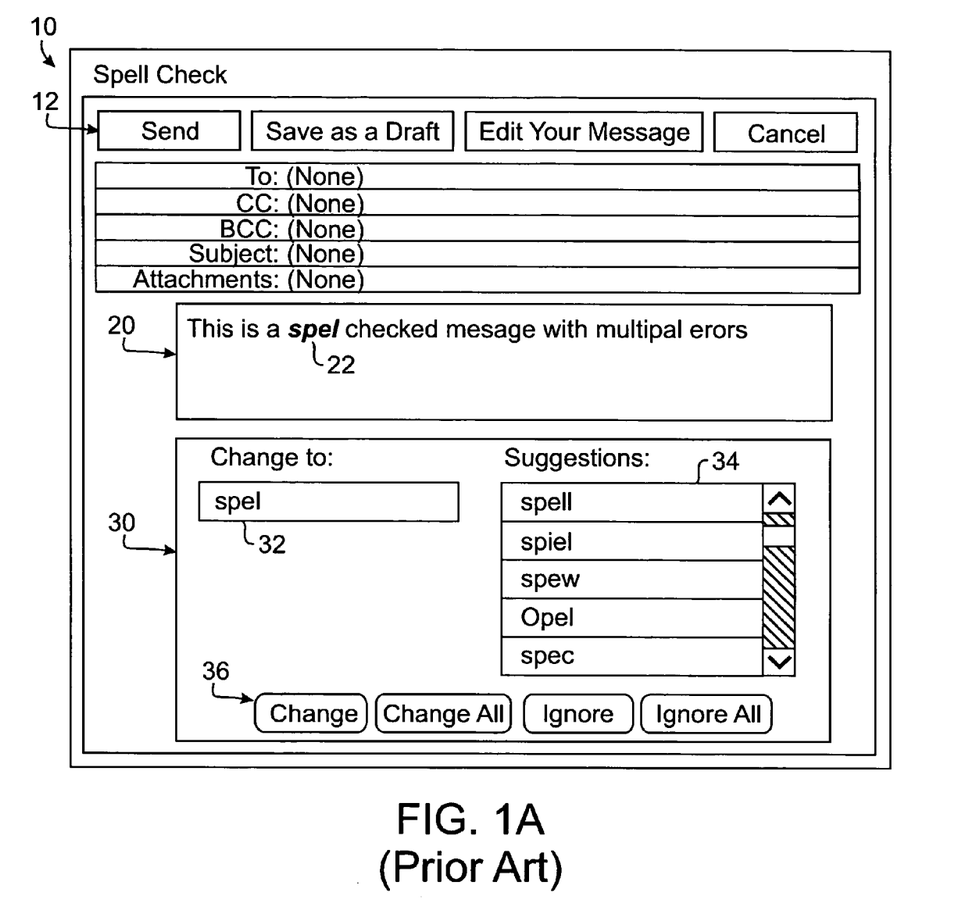
FIGS. 1A-1B illustrates a prior art Yahoo spell checking interface showing first and second errors.
Figure 1B:
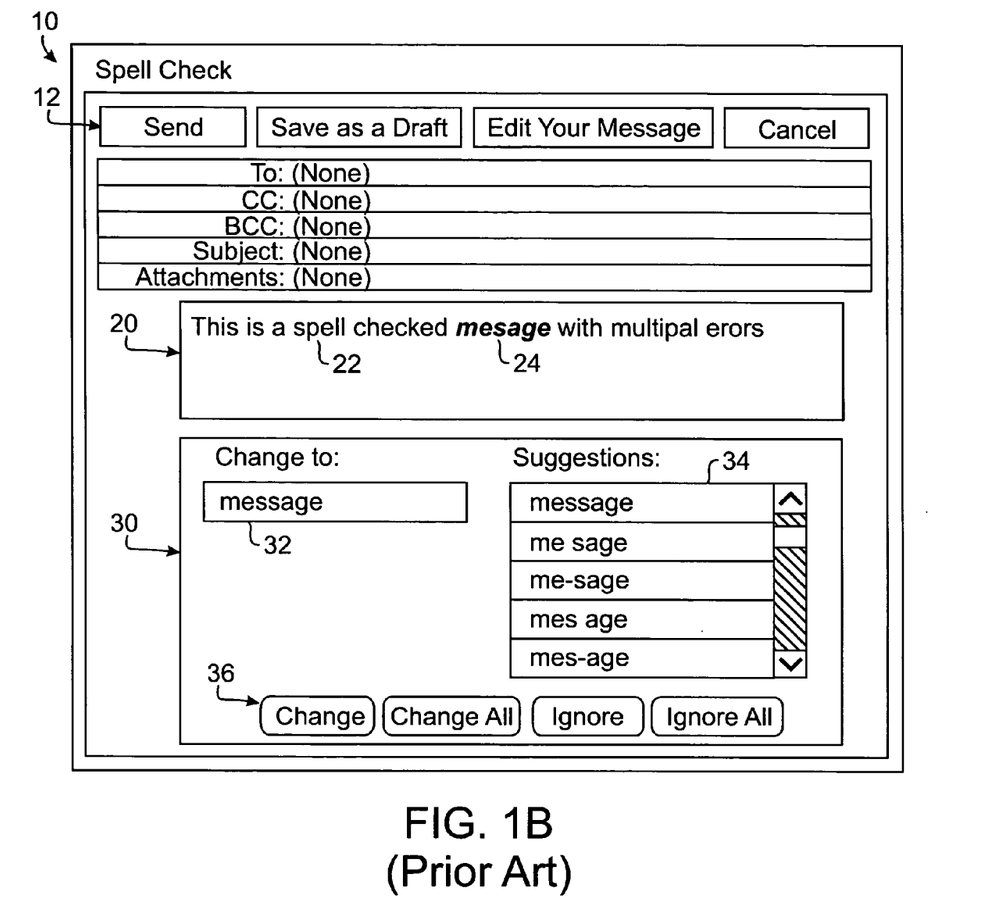
Figure 2:
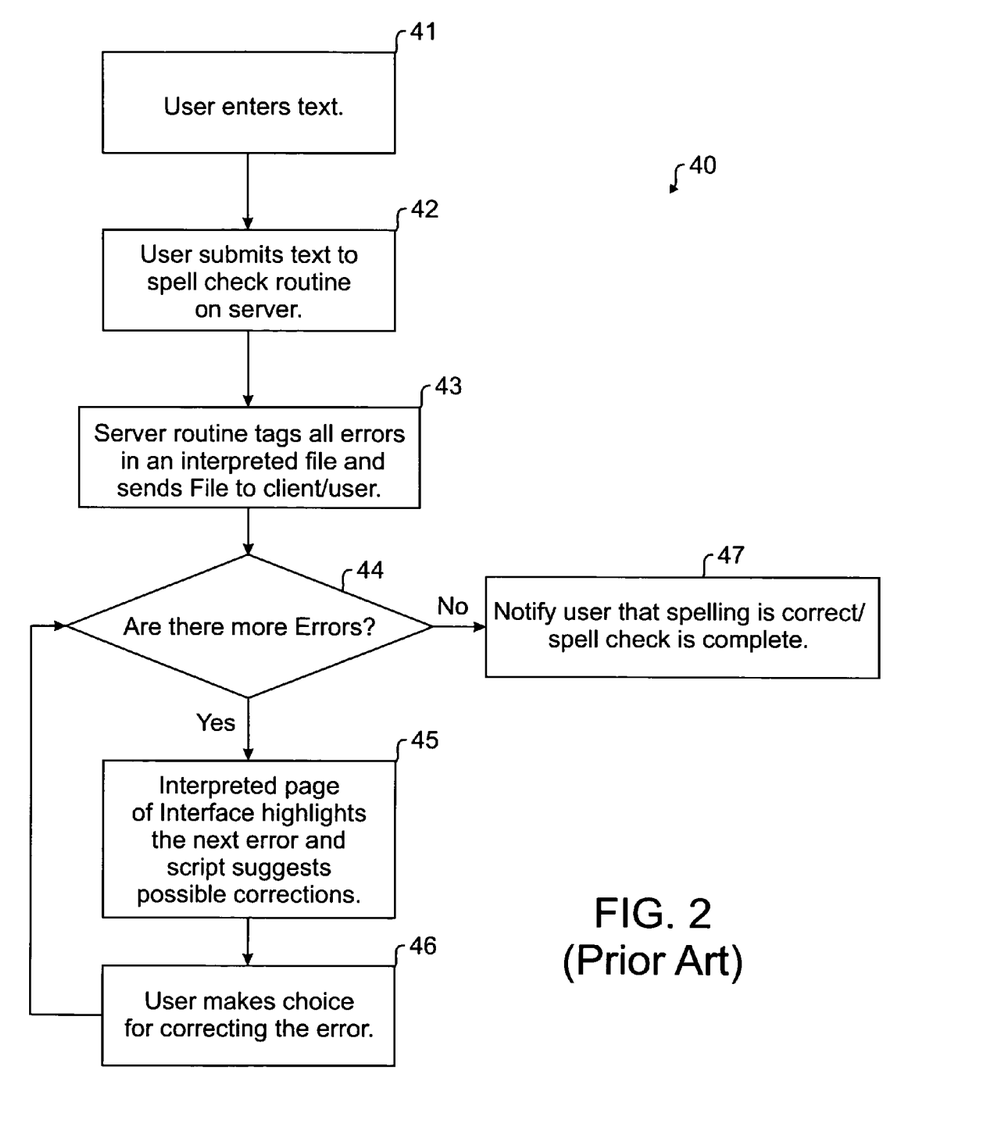
FIG. 2 illustrates a flowchart showing steps that the Yahoo Mail spell checking interface performs when correcting an error in a text message.

Typical e-mail interfaces allow users to compose text messages and to correct spelling or other errors in the text message. Hotmail™ and Yahoo™ are two popular web-based e-mail interfaces, and each provides a spell checking feature. Yahoo's spell checking interface is shown in FIGS. 1A-1B, and a flow chart of the spell checking process it employs is shown in FIG. 2. The spell check interface 10 has a text box 20 that contains the text of the message composed by the user. During spell checking, the text box 20 highlights the first error 22 present in the text, in this example the misspelled word "spel." This first error 22 is highlighted by displaying it in a red color (shown in bold for simplicity in FIG. 1A), and is accompanied by a correction control box 30 that allows the user to fix the error 22. The correction control box 30 includes typical options to allow the user to fix the error, including a correction text box where the user can re-type the misspelled word, a list of suggested spellings 34, and other interface buttons 36 which generally allow the user to make a change to or ignore a particular error. Other typical interface buttons 12 allow the e-mail to be processed (e.g., sent, stored, edited, etc.) as is well known.

When the user addresses (e.g., fixes) the first error 22, the spell check interface 10 continues checking the text in box 20 for the next error 24, as shown in FIG. 1B, in this example the misspelled word "mesage." This second error 24 is highlighted in similar fashion, and again allows the user to address this error using the correction control box 30. This process then similarly continues to allow the user to sequentially correct the next errors in the text (e.g., "multipal," "erors," etc.) (not shown), and when the entirety of the text is edited, permits the user to send the message to intended recipients.

A flow chart 40 illustrating this spelling error identification/correction process is shown in FIG. 2. The user first enters text using a text messaging interface (Step 41), and then elects to spell check the text, which may occur automatically when the message is sent for example. Engaging the spell checking feature causes the text of the message to be sent to a spell checking routine on a server (Step 42). The spell checking routine identifies and tags all errors in the message and formats an interpreted correction file of the text message which is sent back to the user (Step 43). The user then uses the spell check interface 10 as described above to make corrections to the errors identified in the text. If the spell check interface 10 determines that there are errors in the text message (Step 44), the spell check interface 10 highlights the error in the text message and shows suggestions and options for correcting the error (Step 46) as noted earlier, with such suggestions coming from the script of the interpreted correction file. After the user makes a correction to the error (Step 46), the spell check interface 10 returns to Step 44 to allow the next error (if any) to be displayed and corrected.

Hotmail's spell check interface is similar to Yahoo's, as is its process for correcting errors. However, one difference between the two is Yahoo's method of interacting with the server. As noted above, Yahoo sends the message once to the server, at which time an interpreted correction file is compiled and consulted numerous times to serially correct each error in the message. By contrast, Hotmail submits each correction to the server. After fixing a first error, the user's page is refreshed to show the next misspelled word. Thus, the Hotmail spell checker requires as many accesses to the Hotmail server as there are misspelled words in the message. Otherwise, both Yahoo and Hotmail work similarly from the user's perspective, as each allows each error in the message to be highlighted and corrected sequentially.

But these approaches have drawbacks. Specifically, by serially presenting each error in the message to the user, the user has no idea when error checking is engaged of the magnitude of the errors present in the message, e.g., whether one, ten, or more errors are present. Moreover, as the user cannot view all errors simultaneously, the user has no flexibility to correct errors in the order of his choosing (e.g., fourth error first, first error second, etc). This means that the user must instead patiently proceed through each sequential error to know what errors are present, even if in retrospect some errors are uninteresting to the user or are not truly errors. In short, user flexibility, in terms of being able to make a global assessment of all the errors in the message in parallel, is hampered. Moreover, the correction control box 30 typically used in spelling checking interfaces such as Yahoo and Hotmail disrupts visualization of the user's original text message as this box and all of its appurtenant buttons must be displayed somewhere on the screen.

The subject matter of the present disclosure is directed to overcoming, or at least reducing the shortfalls or effects of, one or more of the problems set forth above.

SUMMARY

Error checking and correction techniques for web based applications use an error checking routine on a server or a client station to find errors in electronic text of an E-mail message. The disclosed error checking routine detects errors such as spelling errors in the electronic text and creates a correction file of the electronic text containing tags, markers and other information allowing errors to be displayed and corrected using the user's graphical interface. The graphical interface allows the user to review all the errors concurrently in the correction file and to correct the errors in any order. In addition, the user can modify a correction as many times as wanted, as opposed to not letting the user go back to a previous error until the complete spell checking is done or aborted. In a preferred embodiment, correction is facilitated in response to the user moving a mouse pointer over an error of interest, which provides correction options to be displayed in-line with the original text. The user can then select a suitable correction to correct the error.

BRIEF DESCRIPTION OF THE DRAWINGS

Aspects and implementations of the present disclosure will be best understood with reference to with reference to the accompanying drawings, in which.

While the disclosed error checking and correction techniques are susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. §112.

DETAILED DESCRIPTION

Figure 3A:
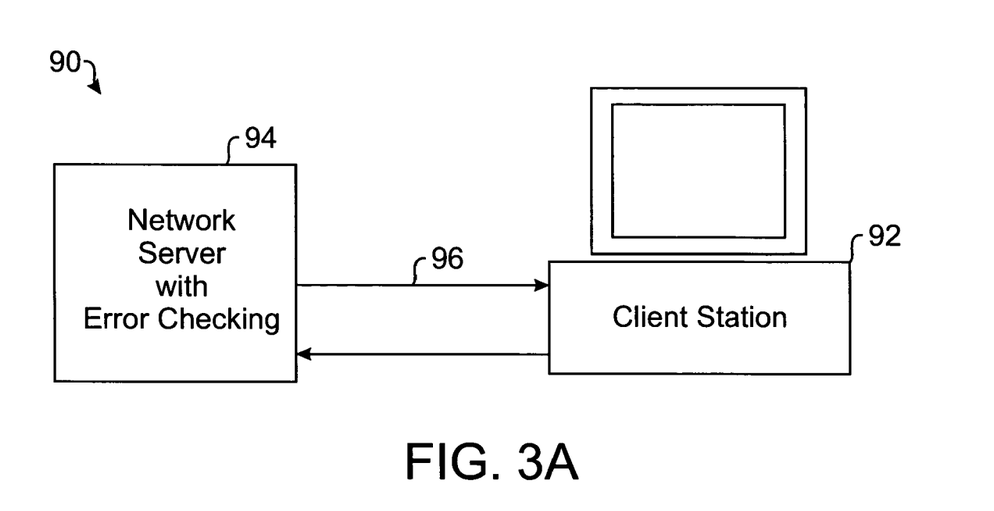
FIGS. 3A-3B illustrate systems in which the error correction schemes of the present disclosure can be implemented.
Figure 3B:
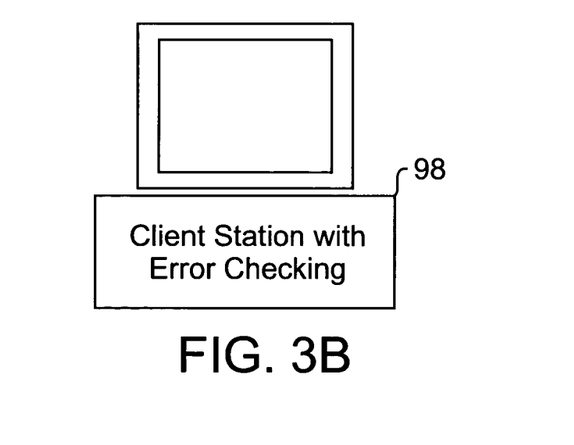

Referring to FIGS. 3A-3B, embodiments of systems for implementing an interface and techniques for correcting electronic text are schematically shown. In FIG. 3A, a system 90 includes a client station 92 connected to a remote server 94 via a network 96. The server 94 has an error checking routine (e.g., a spell checking routine) to be discussed shortly. The network 96 can be a local area network or the Internet, for example. The error checking routine on the server 94 parses a text (e.g., e-mail) message submitted to the server 94 by the user at the client station 92, formats a correction file or page identifying corrections, and returns the correction file to the client station 92 for user action using his error checking interface as will be described in further detail below. In an alternative embodiment shown in FIG. 3B, the error checking routine can reside on a client station 98 so that the user can error check a text message from the user's local system without the need for network interaction, although this is not as preferred as it requires the error checking routine to reside on the user's station.

Figure 4:
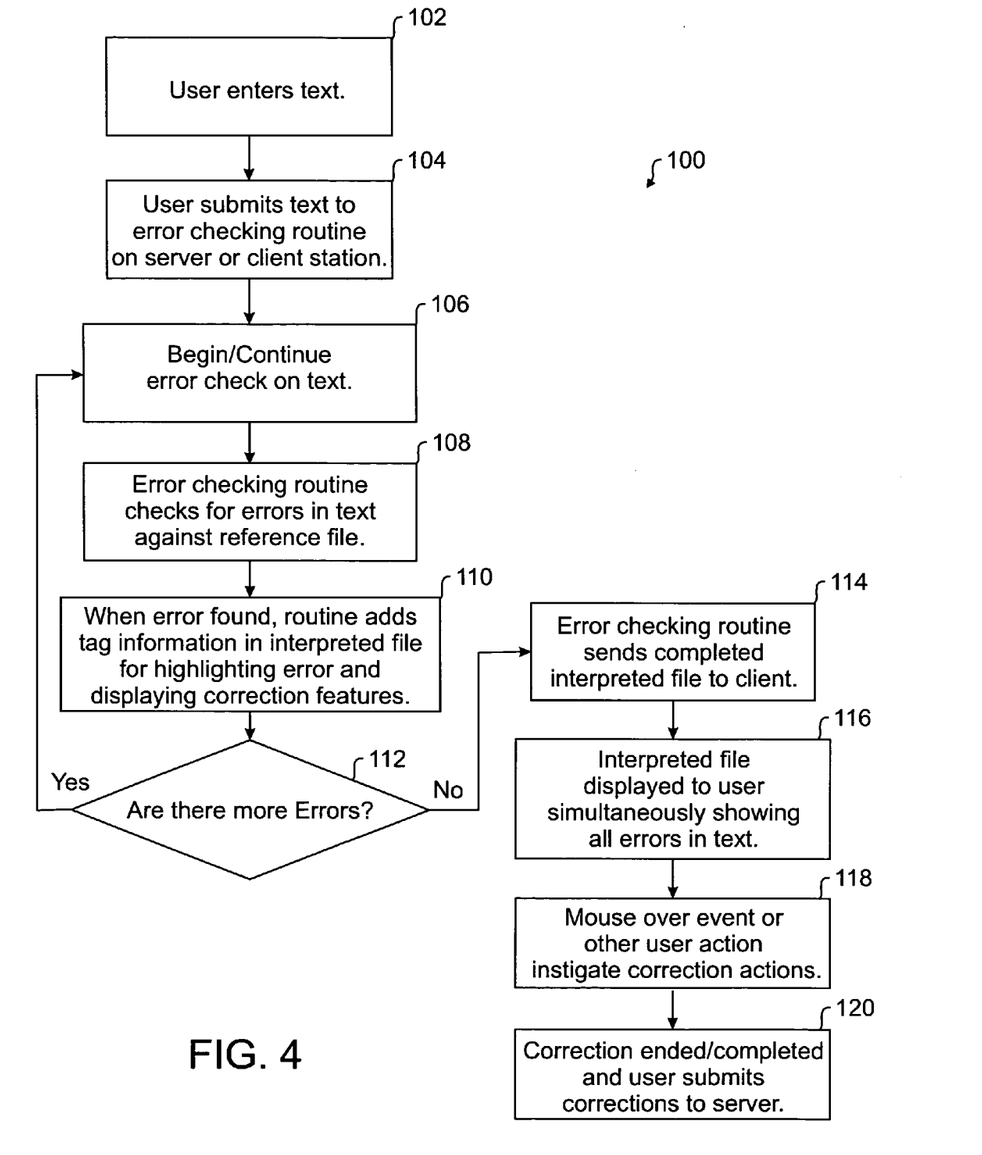
FIG. 4 illustrates a flowchart showing exemplary steps for an error checking routine according to the present disclosure.

FIG. 4 illustrates in flow chart form exemplary steps of the disclosed error checking and correction routine, while FIGS. 5-9 illustrate details of the disclosed error correction interface with which the routine interacts. Referring to FIG. 4, the user first enters text into a text editor, e.g., a browser or web-based text messaging application, such as Safari, Internet Explorer, or Mozilla (Step 102). From the browser application, the user then requests an error check of the text message, which can be an automatic action which takes place, for example, when the user indicates his intention of sending the message. Other steps, such as selecting a language or dictionary for use with the spelling checking routine of the text message, are not shown in FIG. 4 for simplicity.

Once spell checking is engaged, the text is sent to the disclosed error checking routine on the server or client station (Step 104). The routine begins checking for errors in the text message (Step 106) against a reference file (Step 108) which can constitute a user-selected or automatically-selected dictionary. When an error is found, the error checking routine creates a correction file from the user's original text message. The correction file is created by adding tag information, code, and markers (hereinafter "correction information") to a base code of the text message (Step 110). The correction information, amongst other functions, highlights the errors when the correction file is returned to the user for review. In addition, the correction information provides correction features to the correction file as described below which facilitates user correction of the identified errors, as will be illustrated further below.

The routine repeats (Step 112) the error checking steps (Steps 106-110) until the entire text message has been corrected and the correction file is fully populated. When the routine finishes identifying errors, the error checking routine sends the completed correction file to the client station (Step 114), which is then displayed to the user as a dynamic page that concurrently displays all the errors in the text (Step 116). For example, the page having the original text message can be refreshed in the browser application with the correction file. The user can then correct errors anywhere in the text of the displayed correction file, for example, by passing his mouse over correction actions to display and access correction options (Step 118). Thus, the user can correct errors in any order and not just the order that the errors occur within the text. Furthermore, the user is able to correct the errors in the text while able to see the errors displayed in the entire context of the original text message. Once all corrections have been completed or the user elects to end the correction process, the user submits the corrections to the server (Step 120). For example, the user can select a "send" button on their browser application to send the corrected text to the server for forwarding to the intended message recipient.

Figure 5:
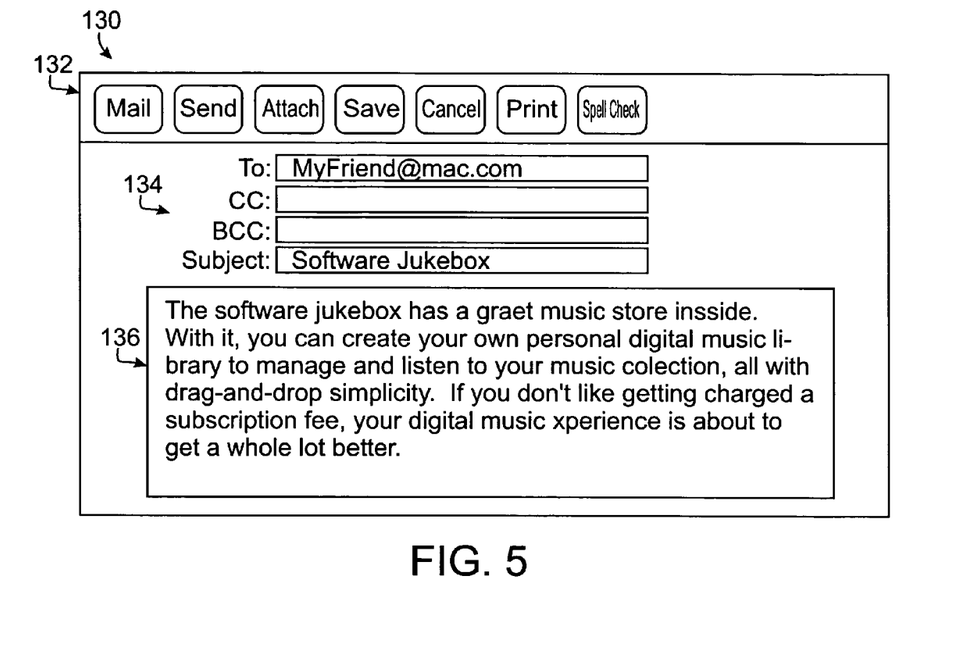
FIG. 5 illustrates an embodiment of a text editor for composing a text message.

FIGS. 5-9 illustrate these steps of FIG. 4 in more detail, and in particular show how the error correction process is reflected and displayed at the user's graphical interface on his client station 92. FIG. 5 shows an embodiment of a text editor 130 for composing a text message, which as previously noted can constitute a browser or web-based text messaging application, such as Safari, Internet Explorer, or Mozilla. The text editor 130 has a menu bar 132 with conventional buttons for performing text-messaging functions, such as send message, attach file, save message, cancel, print, and spell check. The user enters recipient e-mail addresses and other information in text fields 134 and enters a text message in text field 136. When done composing the text message, the user can select the "spell check" button on the menu 132, and the text message is submitted to the server for spelling correction. (Again, spell checking can also occur automatically, e.g., before the message is sent).

Figure 6:
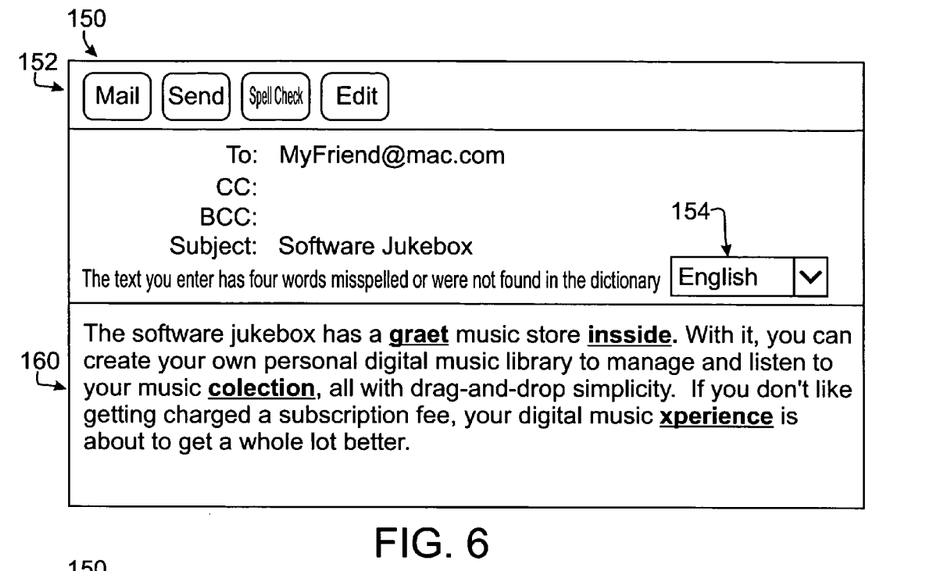
FIG. 6 illustrates an embodiment of an error correction interface showing multiple errors highlighted in a text message.

After the text message is submitted for processing by the spell checking routine at the server 94, the server 94 returns a correction file to the client's browser or other web-based text messaging application, as shown in FIG. 6. In FIG. 6, an error correction interface 150 is illustrated in a refreshed screen of the browser or web-based application, and which shows attributes of the correction file. The error correction interface 150 can be designed for display with any conventional browser, and can be based on HyperText Markup Language (HTML) using standard web-based technology, such as Cascading Style Sheets (CSS), JavaScript, and specifications as defined by the World Wide Web Consortium (W3C). In addition, the error correction interface 150 can also be cross-platform in nature.

Briefly, the interface 150 allows the user to correct errors or discrepancies, such as misspelled or unknown words in the text, using his graphic interface and in accordance with the correction information resident in the correction file. All the corrections for the text are preferably performed on the client station 92 and can be submitted all at once to the server 94 for action and for send-out to intended message recipients. Therefore, the disclosed error checking and correction techniques do not require text to be repeatedly sent to the server in multiple round trips, saving bandwidth and making user participation in the error correction process less cumbersome.

As shown in FIG. 6, every identified error identified in the correction file is concurrently displayed on the interface 150 with a different style than words not requiring correction. For example, spelling errors can be displayed with red, underlined text and can have a larger or bolded font. In this way, for example, the user can readily identify the highlighted words, and is thus easily aware that action may need to be taken to correct the potential errors such highlighting represents. As shown in FIG. 6 for simplicity, words identified as having incorrect spelling are rendered in bold and underlined. The interface 150 can display a message to the user indicating how many errors have been encountered in the text message as shown.

Figure 7:
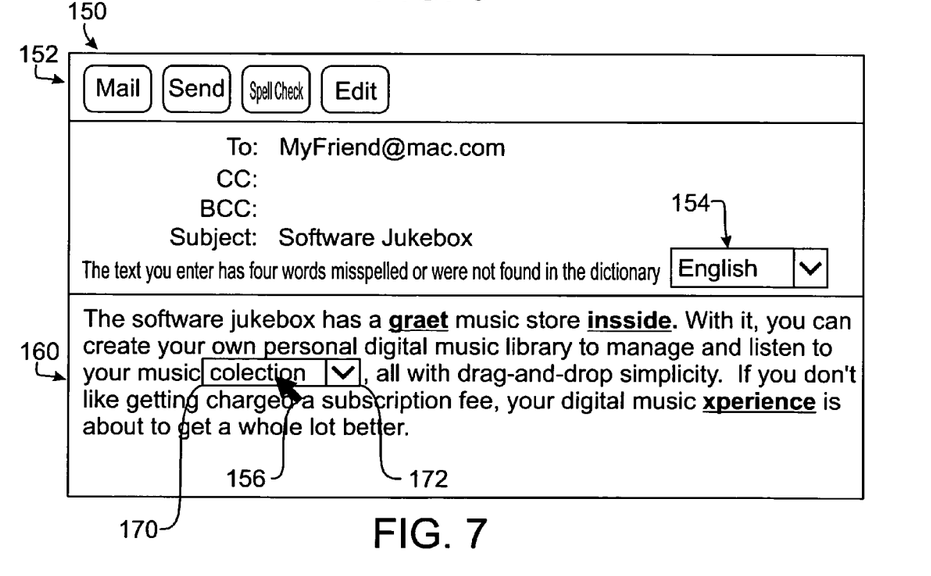
FIG. 7 illustrates a selection control of the disclosed error correction interface.

In a preferred embodiment, and referring to FIG. 7, the user can take action to correct the highlighted words by moving his mouse pointer 156 over any highlighted word of his choosing (e.g., the misspelled word "colection"). (Other actions, such as use of the keyboard to select a highlighted word of interest, or touching the screen on a touch sensitive display panel, could also be used). When the user takes action in this fashion, and speaking generically, the error is automatically redisplayed to provide the user options to correct the error. When the user chooses his correction option from those displayed, the display automatically changes back to standard HTML text so that the affected word will not disrupt the overall look of the page.

Figure 8:
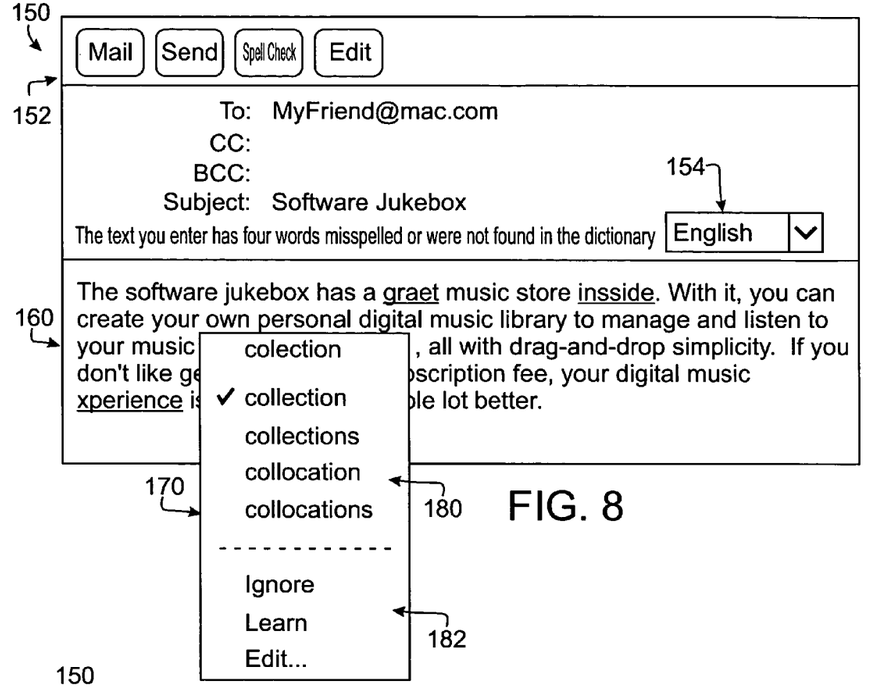
FIG. 8 illustrates an expansion of the selection control of FIG. 7.

Specifically, and as shown in one implementation in FIG. 7, the correction options are placed in a suggestion control 170 of the spell check interface 150 in response to the user moving his mouse pointer 156 over the highlighted word. The suggestion control 170 is in-line with the rest of the text in the field 160 so that the overall appearance and flow of the text is not substantially altered. Clicking on the arrow 172 in the suggestion control 170 expands the suggestion control to show available options for correcting the misspelled word, as shown in FIG. 8. In an alternative embodiment, the user need not select the arrow 172 to expand the suggestion control 170, but instead simply moving the mouse pointer 156 over the highlighted error could automatically expand the suggestion control 170 to show available options for correcting the misspelled word, as shown in FIG. 8.

As shown in FIG. 8, the expanded suggestion control 170 lists options 180 and 182 for the user to select to correct the error. In the present example, the user can select spelling options 180 and determine whether the word "colection" should be changed to words identified by the dictionary of the spell checking routine. In addition, the user can select other options 182, such as selecting whether the word should be ignored as an error in the text message, or learned as a correct word anywhere it appears in the text message. Furthermore, the user can select an ("Edit") option to replace the highlighted word with an edited word to be typed subsequently by the user in a pop-up window (not shown) displayed in response to this option. After editing the word in this pop-up window, the user can select to change only the current highlighted error with the edited word or to "change all" similar highlighted words in the text field 160 with the edited word entered by the user.

Figure 9:
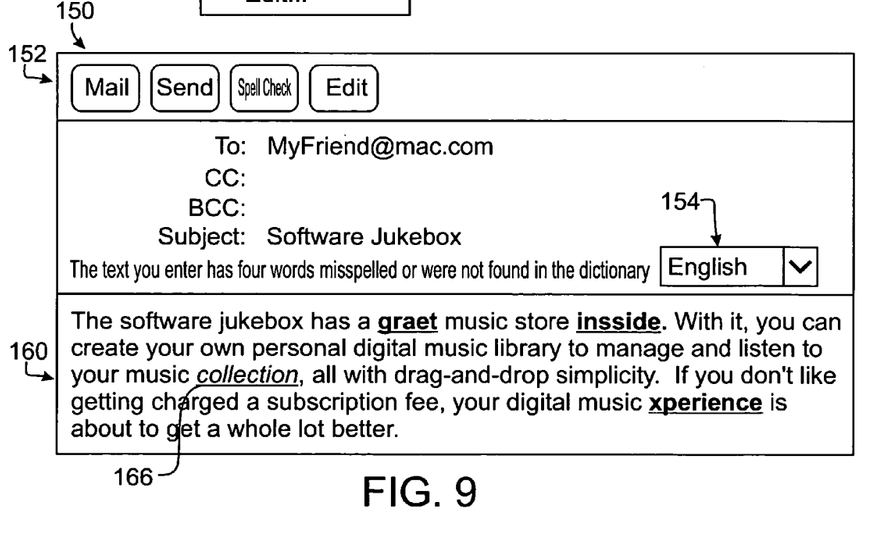
FIG. 9 illustrates a highlighted correction after correcting an error with the selection control of FIG. 8.

FIG. 9 shows the interface 150 and the text field 160 after the user has selected a corrected spelling of the error from the suggestion control 170 of FIG. 8. Specifically, the corrected word 166 "collection" has been selected from the option 180, and is now reformatted to show the now-corrected word. For example, the corrected word can be reformatted with grey underlined letters, which are show in italics in FIG. 9 for simplicity. The corrected word is reformatted in line with the other text of the text field 160 so that the overall flow of the text is not interrupted. For example, the corrected word is not shown positioned within a text box that is inserted into the text field 160. Such a text box would break the overall flow of the original text. In addition, reformatting the corrected word with less conspicuous highlighting still enables the user to recognize that the corrected word was an error. By moving the mouse over the corrected word or selecting the corrected word by one of the other techniques described herein, the user can again access the suggestion control 170 listing options 180 and 182 for the user to correct, change, or edit the previously corrected word. After correcting one error, the user can address any other error in the text field 160 using the same techniques described above.

Once all of the errors have been corrected, or even in advance of correction, the user can choose from a plurality of menu buttons 152 on the interface 150 to allow the message to be sent, spell checked, or edited, or can allow the user to return to his mailbox ("mail"). Thus, when the "edit" button is selected, the correction process is stopped, and the client's browser sends the text with all modifications to the server. In turn, the server applies the modifications to the original text and returns the modified text to the original text editor with the corrections, such as shown in FIG. 5. When the "spell check" button is selected, the text message with any corrections is sent back to the server to be spell checked again.

It should be noted that the interface 150 does not require the user to correct or address every potential error highlighted by the spell checking routine. Instead, the user may review all of the highlighted errors, fix those needing correction, ignore others after a visual review, and then send the e-mail without the need to necessarily move sequentially through each error whether it requires correction or not.

In any event, when the "send" button on the menu 152 is selected, the correction file with any corrections is sent back to the server 94 for forwarding to the intended message recipients.

Although the foregoing amply illustrates to a computer programmer of skill how to make and use the disclosed error correction routine and accompanying user interface, some computer coding specifics are disclosed to further illustrate implementations of the disclosed embodiments, and to illustrate other useful aspects. For example, the interface 150 can assume that a particular language is to be used, and after spell checking can return evidence of that language in dictionary window 154. However, the user may have written the message in a different language, and hence may wish to change that language in window 154. If a different language or dictionary is selected from the control 154, the correction file is resubmitted to the server 94 for spell checking the text against the newly selected language or dictionary. A form to select the language can be implemented with the following code:

```
<select onchange="document.spellform.ACTION.value='SPELL';
document.spellform.submit( );" name="spellDictionaries">
<option selected value="0">English</option>
<option value="1">French</option>
<option value="2">German</option>
<option value="3">Italian</option>
<option value="4">Spanish</option>
<option value="5">Dutch</option>
<option value="6">Portuguese</option>
<option value="7">Swedish</option></select>
```

As noted above, identified errors are highlighted by the error checking routine in a predefined style which accompanies the correction file sent by the server 94 to the client station 92. Accordingly, a style section is added to the correction file by the disclosed error checking routine, which indicates how the errors are to be formatted on the interface 150. For example, the style section has a beginning tag, <style>, which indicates that the selection defines a style. The styles are then enumerated with formatting characteristics or fonts, and the section is closed with an ending tag, </style>. Below is an exemplary style section that can be added to the correction file with the disclosed error checking routine:

```
<style>
.misspelledword { border-bottom: 2px dotted #ff3333 }
.correctedword { border-bottom: 2px dotted #999999 }
.divWord { display: inline; }
.divPopup { display: none; }
</style>
```

The style section preferably formats an error with a neutral style. For example, the present style section highlights misspelled words with a 2-pixel dotted line under the text and gives the misspelled text a red color, #ff3333. In addition, the present style section highlights corrected words with a 2 pixel dotted line under the text, and gives the corrected text a grey color, #999999. While the errors and corrected errors are highlighted with different neutral styles, a number of formatting styles can be used to highlight the errors, including changing the text of the error to a different color or making the error bold, italic, or a larger font size. The code of the style section for formatting the errors is located in one location in the correction file. Thus, only one portion of code must be changed if the server routine needs to be modified to provide a different highlighting format.

In addition to the style section, the correction file is preferably embedded with markers for marking the location of each error. In one embodiment, each error is positioned inside a marker element, such as DIV or SPAN. Each marker element is uniquely identified using an attribute, such as <DIV ID=uniqueID>, and also contains HTML elements to highlight the error using styles as defined above or some standard HTML marker, such as <B></B> for bold, <FONT COLOR="RED"></FONT> for red color, or any other marker that visually indicates an incorrect word. The markers highlight the error in-line with the other text of the message, thus allowing the user to view all text errors at one time without disturbing the flow of the text.

In addition to adding style markers, the disclosed error checking routine adds code around the error to make it actively correctable, so-called pop-up information. In a preferred embodiment, JavaScript is used for the added code. As is known, JavaScript is a "lightweight" interpreted programming language that is widely supported by most internet web browsers, such as Internet Explorer. The added code makes the error responsive to a mouse-over-event or another user action. When such action occurs, a pop-up or other correction feature is produced inline with the error, as shown previously.

The following exemplary code can be added to the base HTML code of the correction file to correct the misspelled word "colection," and which illustrates coding responsive to the user action:

```
<DIV class="divWord" onmouseover="switchToPopup(this);"
id="divWord5"><DIV class="misspelledword" style="display: inline; "
id="word">colection</DIV><DIV class="divPopup" style="display:
none; "
id="word"><select onchange="revertToWord(this);"
name="0.9.41.11.1.0.1.0">
<option value="0">colection</option>
<option value="1">collection</option>
<option value="2">collections</option>
<option value="3">collocation</option>
<option value="4">collocations</option>
<option value="5">------</option>
<option value="6">Ignore</option>
<option value="7">Learn</option>
<option value="8">Edit...</option></select></DIV></DIV>
```

The code calls a programming class of "misspelledword," and [onmouseover="switchToPopup(this)] calls an action to be taken when the mouse is over the error of the text. In the present example, the inserted code calls SwitchtoPopup, which is a function that displays a pop-up window filled with options for the user to select to correct the misspelled word (see FIGS. 7 and 8). An exemplary implementation of a SwitchtoPopup function is provided below.

```
function switchToPopup(theDiv) {
    var span1, span2;
    var allDiv = document.getElementsByTagName("DIV");
    var i, divLength, oneDiv, theDivID;
    divLength = allDiv.length;
    for(i=0;i<divLength;i++) {
        oneDiv = allDiv[i];
        theDivID = oneDiv.id;
        if (theDivID && theDivID.indexOf("divWord") == 0 &&
        theDiv
!= oneDiv) {
            span2 = oneDiv.childNodes.item(1);
            if (span2.style.display === "inline") {
                span1 = oneDiv.childNodes.item(0);
                span1.style.display = "inline";
                span2.style.display = "none";
            }
        }
    }
    // Show popup for the appropriate div
    span1 = theDiv.childNodes.item(0);
    span2 = theDiv.childNodes.item(1);
    if (span1.style.display = "inline") {
        span1.style.display = "none";
        span2.style.display = "inline";
        currentPopupSelectIndex =
        span2.childNodes(0).selectedIndex;
    } else {
        currentPopupSelectIndex = 0;
    }
}
```

In addition to code for detecting a user action to produce a pop-up window, the inserted code has a plurality of correction options and actions, which include various alternative spelling for the highlighted error, and functions "Ignore", "Learn", "Edit", etc. When the user selects an option or an action from the user interface, the user interface element is replaced by regular HTML text with appropriate attributes to make the word flow back into the original text without substantially breaking the overall layout of the original text message.

Although JavaScript popup windows activated by mouse-over-events are used in the present embodiment, alternative techniques for displaying suggested corrections known in the art can be used. For example, the user can click to a correction form presented in a new window. In addition, a pop-up window can be activated by a different user action than a mouse-over-event as noted previously.

The disclosed error checking routine and interface are illustrated in the context of correcting spelling in an e-mail message. However, such routines can be used to modify various documents other than e-mails, including web page text, photo captions, server-based source code editing, documents in word processing programs, spreadsheets, or presentations, etc. Furthermore, while the illustrated errors of interest in the present disclosure are spelling errors, other types of errors (e.g., grammar, syntax, etc.) can be similarly treated using the disclosed techniques. Correcting these other types of errors would simply require access to different types of reference files other than dictionaries. In short, spell checking and correction of an e-mail should be understood as merely an exemplary implementation of the disclosed techniques.

Once the functional aspects of the disclosed scheme are known as disclosed herein, the programming of such functionality is a routine matter, and is accomplishable using many different programming languages and within the context of many different operating systems. Of course, ultimately the invention disclosed herein would be coded into compute code and stored on a computer-readable media, such as a compact disk, a tape, stored in a volatile or non-volatile memory, etc.

The foregoing description of preferred and other embodiments is not intended to limit or restrict the scope or applicability of the inventive concepts. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method for displaying and allowing the correction of a plurality of errors in an electronic text entered by a user, comprising:
    displaying the electronic text on a page of an application on a client station, the page being the one on which the user composes the electronic text;
    sending, after the act of displaying, the electronic text from the client station to an error checking routine;
    processing the electronic text using the error checking routine to create a correction file, wherein the correction file provides correction information for each of the plurality of errors in the displayed electronic text;
    sending the correction file to the client station; and
    updating the displayed electronic text on the page of the client station using the correction file, the page being the one on which the user composes the electronic text, wherein each of the plurality of errors is concurrently highlighted on the page, and wherein each highlighted error is selectable by the user in any order to access the correction information for each error.

2. The method of claim 1, wherein the error checking routine is remote from the client station.

3. The method of claim 2, wherein the error checking routine is resident on a server.

4. The method of claim 1, wherein the error checking routine is resident within the client station.

5. The method of claim 1, wherein each highlighted error is selectable by moving a mouse pointer over the highlighted error.

6. The method of claim 5, wherein moving the mouse pointer over the highlighted error displays the correction information for the error or allows for the correction information to be displayed.

7. The method of claim 1, wherein the correction information selected by the user defines a corrected error, and wherein the corrected error replaces the highlighted error in the displayed electronic text of the page.

8. The method of claim 7, wherein the corrected error is highlighted in the displayed electronic text with a different highlighting than the highlighted error.

9. The method of claim 7, wherein the corrected error is displayed in line with adjacent electronic text.

10. The method of claim 9, wherein the corrected error is displayed without a text box in the electronic text.

11. The method of claim 7, wherein the corrected error is selectable by the user to access the correction information.

12. The method of claim 11, wherein each corrected error is selectable by moving a mouse pointer over the corrected error.

13. The method of claim 1, wherein the error checking routine comprises a spell checking routine.

14. The method of claim 1, further comprising an option to allow selection of a language for the error checking routine.

15. The method of claim 1, wherein the electronic text comprises an electronic mail message, and further comprising providing an option on the page for sending the message.

16. The method of claim 1, wherein creating the correction file comprises adding format codes to a base code of the electronic text.

17. The method of claim 1, wherein the page displays the electronic text in HyperText Mark-up Language.

18. A method for displaying and allowing the correction of a plurality of errors in an electronic text entered by a user, comprising:
    displaying the electronic text on a page of an application on a client station, the page being the one on which the user composes the electronic text;
    sending, after the act of displaying, the electronic text from the client station to an error checking routine;
    receiving a correction file at the client station, wherein the correction file provides correction information for each of the plurality of errors in the displayed electronic text; and
    updating the displayed electronic text on the page of the application using the correction file, the page being the one on which the user composes the electronic text, wherein each of the plurality of errors in the displayed electronic text are concurrently highlighted, and wherein correction information for each error allows each error to be accessed by the user in any order.

19. The method of claim 18, wherein the error checking routine is remote from the client station.

20. The method of claim 19, wherein the error checking routine is resident on a server.

21. The method of claim 18, wherein the error checking routine is resident within the client station.

22. The method of claim 18, wherein each highlighted error is selectable by moving a mouse pointer over the highlighted error.

23. The method of claim 22, wherein moving the mouse pointer over the highlighted error displays the correction information for the error or allows for the correction information to be displayed.

24. The method of claim 18, wherein the error checking routine comprises a spell checking routine.

25. The method of claim 18, further comprising an option to allow selection of a language for the error checking routine.

26. The method of claim 18, wherein the electronic text comprises an electronic mail message, and further comprises providing an option on the page for sending the message.

27. The method of claim 18, wherein creating the correction file comprises adding format codes to a base code of the electronic text.

28. The method of claim 18, wherein the page displays the electronic text in HyperText Mark-up Language.

29. The method of claim 18, further comprising:
replacing one of the highlighted plurality of errors with a user selectable corrected error, and
replacing a user interface code associated with the one of the highlighted plurality of errors with formatting information for the corrected error.

30. The method of claim 18, wherein the correction file includes a single editable program code variable for defining highlighting information for all of the plurality of errors.

31. A method for allowing the correction of a plurality of errors in an electronic text entered by a user and displayed on a page of an application, the page being the one on which the user composes the electronic text, comprising:
processing the electronic text using an error checking routine to identify the plurality of errors; and
creating a correction file, wherein the correction file comprises:
correction information for each of the plurality of errors,
highlighting information for updating the displayed electronic text on the page by concurrently highlighting each of the plurality of errors within the displayed electronic text on a graphical user interface,
formatting information for the corrected error, the formatting information replacing user interface code associated with the highlighted error when the highlighted error is replaced by the corrected error, and
pop-up information to allow a user to display the correction information at any given highlighted error in response to user selection of that error;
wherein the correction information includes a selectable corrected error, the corrected error when selected replaces the highlighted error and all other similar highlighted errors in the displayed electronic text of the page.

32. The method of claim 31, wherein user selection comprises moving a mouse pointer over the highlighted error.

33. The method of claim 32, wherein moving the mouse pointer over the highlighted error displays the correction information for the error or allows for the correction information to be displayed.

34. The method of claim 31, wherein the error checking routine comprises a spell checking routine.

35. The method of claim 31, wherein the correction file further comprises an option to allow selection of a language for the error checking routine.

36. The method of claim 31, wherein creating the correction file comprises adding format codes to a base code of the electronic text.

37. The method of claim 31, wherein the correction file includes a single editable program code variable for defining the highlighting information for all of the plurality of errors.

38. A computer-readable medium containing a program for performing a method for displaying and allowing the correction of a plurality of errors in an electronic text entered by a user, the method comprising:
displaying the electronic text on a page of an application on a client station, the page being the one on which the user composes the electronic text;
sending, after the displaying, the electronic text from the client station to an error checking routine;
processing the electronic text using the error checking routine to create a correction file, wherein the correction file provides correction information for each of the plurality of errors;
sending the correction file to the client station; and
updating the electronic text displayed on the page at the client station using the correction file, the page being the one on which the user composes the electronic text, wherein each of the plurality of errors is concurrently highlighted on the page, and wherein each highlighted error is selectable by the user in any order to access the correction information for each error.

39. The computer-readable medium of claim 38, wherein each highlighted error is selectable by moving a mouse pointer over the highlighted error.

40. The computer-readable medium of claim 39, wherein moving the mouse pointer over the highlighted error displays the correction information for the error or allows for the correction information to be displayed.

41. The computer-readable medium of claim 38, wherein the error checking routine comprises a spell checking routine.

42. The computer-readable medium of claim 38, wherein the electronic text comprises an electronic mail message, and further comprises providing an option on the page for sending the message.

43. The computer-readable medium of claim 38, wherein the page displays the electronic text in HyperText Mark-up Language.

44. A computer-readable medium containing a program for performing a method for displaying and allowing the correction of a plurality of errors in an electronic text entered by a user, the method comprising:
displaying the electronic text on a page of an application on a client station, the page being the one on which the user composes the electronic text;
sending, after the displaying, the electronic text from the client station to an error checking routine; and
receiving a correction file at the client station from the error checking routine, wherein the correction file provides correction information for each of the plurality of errors in the displayed electronic text;
updating the displayed electronic text on the page of the application, the page being the one on which the user composes the electronic text, wherein each of the plurality of errors in the displayed electronic text are concurrently highlighted, and wherein correction information for each error allows each error to be accessed by the user in any order.

45. The computer-readable medium of claim 44, wherein each highlighted error is selectable by moving a mouse pointer over the highlighted error.

46. The computer-readable medium of claim 45, wherein moving the mouse pointer over the highlighted error displays the correction information for the error or allows for the correction information to be displayed.

47. The computer-readable medium of claim 44, wherein the error checking routine comprises a spell checking routine.

48. The computer-readable medium of claim 44, wherein the electronic text comprises an electronic mail message, and further comprising providing an option on the page for sending the message.

49. The computer-readable medium of claim 44, wherein the page displays the electronic text in HyperText Mark-up Language.

50. The computer-readable medium of claim 44, the method further comprising:
- replacing one of the highlighted plurality of errors with a user selectable corrected error, and
- replacing a user interface code associated with the one of the highlighted plurality of errors with formatting information for the corrected error.

51. The computer readable medium of claim 44, wherein the correction file includes a single editable program code variable for defining highlighting information for all of the plurality of errors.

52. A computer-readable medium containing a program for performing a method for allowing the correction of a plurality of errors in an electronic text entered by a user and displayed on a page of an application, the page being the one on which the user composes the electronic text, the method comprising:
- processing the electronic text using an error checking routine to identify the plurality of errors; and
- creating a correction file, wherein the correction file comprises:
  - correction information for each of the plurality of errors,
  - highlighting information for updating the displayed electronic text on the page by concurrently highlighting each of the plurality of errors within the displayed electronic text on a graphical user interface,
  - formatting information for the corrected error, the formatting information replacing user interface code associated with the highlighted error when the highlighted error is replaced by the corrected error, and
  - pop-up information to allow a user to display the correction information at any given highlighted error in response to user selection of that error,
  - wherein the correction information for each error includes a selectable corrected error, the corrected error when selected replaces the highlighted error and all other similar highlighted errors in the displayed electronic text of the page.

53. The computer-readable medium of claim 52, wherein user selection comprises moving a mouse pointer over the highlighted error.

54. The computer-readable medium of claim 53, wherein moving the mouse pointer over the highlighted error displays the correction information for the error or allows for the correction information to be displayed.

55. The computer-readable medium of claim 52, wherein the error checking routine comprises a spell checking routine.

56. The computer-readable medium of claim 52, wherein the correction file further comprises an option to allow selection of a language for the error checking routine.

57. The computer-readable medium of claim 52, wherein creating the correction file comprises adding format codes to a base code of the electronic text.

58. The computer readable medium of claim 52, wherein the correction file includes a single editable program code variable for defining the highlighting information for all of the plurality of errors.

59. A computing system comprising a client computing station and a server, the client computing station and the server configured to communicate over a network,
- wherein the client computing station includes a client processing module programmed to:
  - displaying an electronic page of an application on a display, the page being the one on which the user composes the electronic text, the electronic text including a plurality of errors,
  - sending, after the act of displaying, the electronic text to the server over the network,
  - receiving a correction file from the server over the network, and
  - updating the displayed electronic text on the page using the correction file, the page being the one on which the user composes the electronic text, wherein each of the plurality of errors in the displayed electronic text are concurrently highlighted, and wherein correction information for each error allows each error to be accessed by the user in any order;
- wherein the server includes a server processing module programmed to:
  - receiving the electronic text from the client station over the network,
  - processing the electronic text using a error checking routine to create the correction file, wherein the correction file provides correction information and highlighting information for each of the plurality of errors,
  - sending the correction file to the client station over the network.

* * * * *